Dec. 10, 1946. E. L. SLINGLUFF ET AL 2,412,429
STRIPING FLEXIBLE STRIP MATERIAL
Filed Jan. 20, 1944
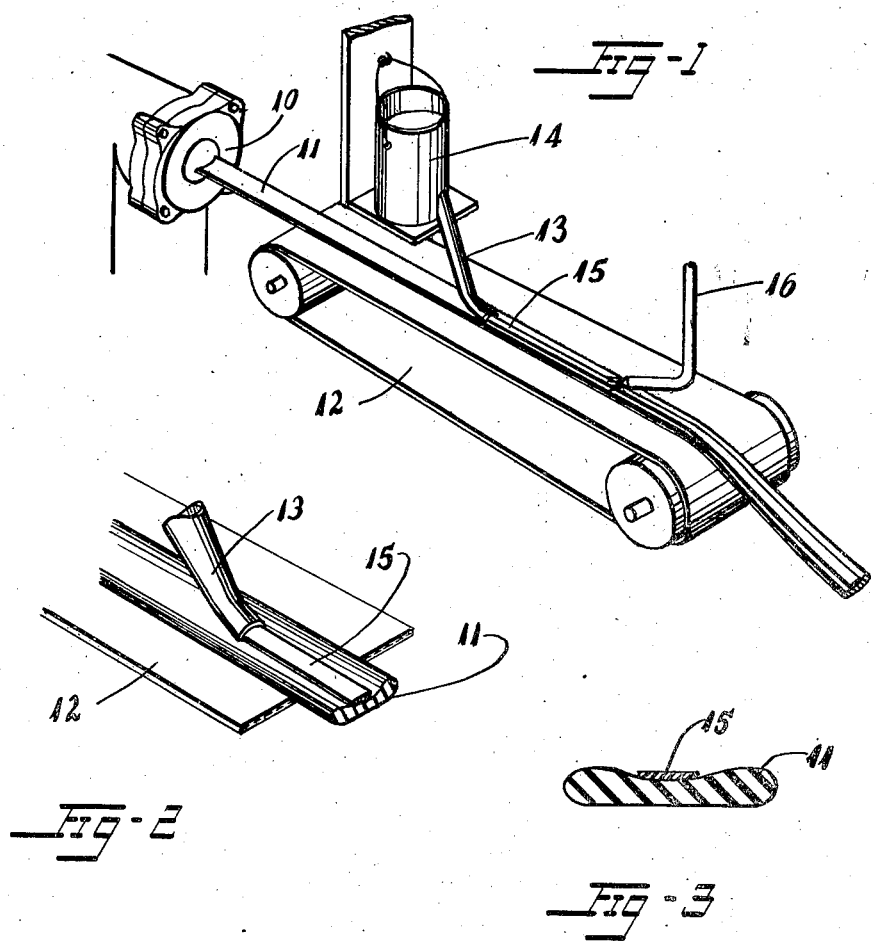
Inventor
Eugene L. Slingluff
Donald R. Scheu
By Harold S. Meyer
Atty.

Patented Dec. 10, 1946

2,412,429

UNITED STATES PATENT OFFICE

2,412,429

STRIPING FLEXIBLE STRIP MATERIAL

Eugene L. Slingluff, Bath Township, Summit County, and Donald R. Scheu, Akron, Ohio, assignors to The B. F. Goodrich Company, New York, N. Y., a corporation of New York Application January 20, 1944, Serial No. 519,034

5 Claims. (Cl. 18—61)

It is often desirable to provide flexible strip material with contrasting stripes, either for identification or for decorative purposes. Completely satisfactory means for applying stripes to flexible strips of thermoplastic materials such as plasticized polyvinyl chloride have not heretofore been available, the striping means having been either too expensive, unreliable, or incapable of forming a sufficiently wear-resistant stripe.

We have found that neat and extremely durable stripes can easily be applied to flexible strip material such as plasticized polyvinyl chloride by feeding a solution or liquid suspension of the same or similar material to the surface of the strip from a nozzle having approximately the same dimensions as the width of the stripe and preferably heating the surface to fuse the stripe and bond it to the base material.

In the accompanying drawing Fig. 1 shows a suitable arrangement of equipment for practice of the invention, Fig. 2 is an enlarged view showing application of the striping liquid and Fig. 3 is an enlarged cross-section of the final product.

The base material to which the stripes are to be applied may suitably be a polyvinyl chloride resin or a resin which is a copolymer of vinyl chloride with minor proportions of other material such as vinyl acetate, vinylidene chloride or an acrylic ester, and which contains sufficient plasticizer to give it the desired degree of flexibility. Such compositions are widely used in the manufacture of many products including tubing, suspender straps, waist belts, wire insulation, and the like, such as can be formed in continuous lengths by forcing the heated material through a suitably shaped die of an extrusion machine. Other flexible materials including other vinyl resins, cellulose esters, or still others may be substituted.

The striping material is preferably a solution or suspension made from the same resin as the base material or a similar resin which will fuse with it to form an inseparable bond, and will ordinarily contain the same proportion of plasticizer, and in addition coloring matter to impart a contrasting color. The quantity of solvent or suspension medium should be sufficient to give a free-flowing but moderately viscous liquid solution.

The striping nozzle may be made of any suitable material such as glass or metal. For narrow stripes the opening may be circular, while for broader stripes an oval orifice or an elongated slot with rounded or square ends is suitable. The nozzle is supplied with the striping liquid from a source so located that a slow flow will occur through the nozzle. The nozzle is then located close to the surface of the strip material, preferably inclined with the nozzle opening facing in the direction of motion of the strip, and the strip is drawn beneath it. The nozzle may but need not be in direct contact with the strip. As the striping liquid flows from the nozzle the motion of the strip draws the liquid from the nozzle, causing a uniform band of liquid to be deposited on the strip.

When extruded material is to be striped, it is preferred to apply the stripes on the freshly extruded material. This will avoid an additional handling of the material for the application of stripes, and has the further advantage that the residual warmth of the freshly extruded strip will facilitate evaporation of solvent from the striping liquid and promote bonding of the stripe to the base.

After the stripe has had time to dry essentially free from solvent, which requires only a short travel of the moving strip when the solvent is properly selected, it may be desirable to apply heat to remove residual solvent and fuse the stripe to the base. This may be accomplished by directing a blast of hot air, or even a small flame, on the stripe, or by focusing a beam of infra-red radiation on it.

As a specific example of one embodiment of our invention a composition containing 60 parts by weight of polyvinyl chloride and 40 parts of a plasticizer is extruded through a heated die 10 at the rate of about 100 feet per minute to produce a strip 11 suitable for use in making belts or suspenders. The hot strip issuing from the die is received on a belt conveyor 12 which carries it horizontally away. A glass nozzle 13 with a circular orifice about one-sixteenth inch in diameter is placed in light contact with the strip about five feet from the die of the extrusion machine, with the opening facing in the direction of travel (away from the extrusion machine) and is fed with a solution in methyl ethyl ketone of a vinyl chloride resin mixed with the same proportion of plasticizer and with a coloring matter contrasting with the strip, the volume of solvent being such as to give a 12% solution. This solution has a viscosity comparable to a thin syrup, and flows slowly from the nozzle under the influence of a moderate gravity head of about one foot, established by a suitably located supply tank 14.

The moving strip draws the striping liquid into a uniform band 15 which deposits on the strip as a neat and uniform stripe about one-sixteenth inch wide. Considerable variations in speed of travel of the strip do not appreciably affect the dimensions of the stripe, since more rapid motion of the strip tends to draw the liquid more rapidly from the orifice of the nozzle.

The distance from the die of the extruding machine to the nozzle is important, since the strip issuing from the die is quite hot. If the nozzle is too close, the strip will still be so hot that it will boil the solvent and produce a bubbly blemished stripe, whereas if it is too far away the strip will have cooled to such an extent that evaporation of solvent from the striping liquid will be greatly retarded. The best position can only be determined by trial since it depends on the dimensions of the strip.

The residual heat in the extruded strip rapidly evaporates the methyl ethyl ketone solvent from the stripe so that it is substantially dry after about thirty feet further travel of the strip. A small flame 16 is then directed on the stripe, being so adjusted as to fuse the material of the stripe without heating it to a deleteriously high temperature. The heat brings about fusion of the adjoining materials, producing an inseparable bond, and also imparts a gloss to the surface of the stripe which adds to its attractiveness. After a moment's further cooling the strip is finished, ready to be rolled up or otherwise disposed of.

In some instances it may be desirable to substitute for solutions of striping material an aqueous suspension. For example, a latex is made by polymerization of an aqueous emulsion of vinyl chloride mixed with one-fourth of its weight of vinylidene chloride, and this latex is mixed with an emulsion of plasticizer and coloring matter to produce a suspension containing about 45% non-volatile material. Because of its greater concentration this suspension deposits a thicker stripe than the solution referred to above. The water in which the striping material is suspended is less volatile than methyl ethyl ketone, hence the striping nozzle should be placed somewhat nearer the extrusion die so as to deposit the stripe on material having a temperature close to the boiling point of the water. The dried latex deposit does not develop its full strength until it is heated to fuse together the globules which were originally suspended in the water, hence the heat treatment of the stripe deposited from the aqueous suspension is very important. After suitable heat treatment, the stripe is inseparably bonded to the base material as in the case of the stripe deposited from the solution, but because of its greater thickness it is more resistant to wear.

If desired, a plurality of stripes may be applied simultaneously, of the same or different widths, and of like or unlike colors. The stripes may be applied not only to flat surfaces as in the example above, but also to curved surfaces. When applied to polyvinyl chloride wire insulation, stripes applied in accordance with this invention provide a simple, easily applied and inexpensive means of identification of different electrical circuits without necessitating any alteration of the insulating material itself. Furthermore, the invention is not limited to the application of straight stripes, since sinuous stripes can readily be made by lateral oscillation of the striping nozzles. In addition the stripes can be applied to strip material otherwise made than by the extrusion process set forth above, for example, to material formed by calendering, solution casting or the like.

We claim:

1. The method of striping a thermoplastic flexible strip material, which comprises extruding a continuous strip of the material through a heated die, advancing the strip material retaining heat from the extrusion operation adjacent to a nozzle, flowing from the nozzle a striping liquid comprising a fusible binder capable of adhering to the strip material and a volatile suspension medium, and depositing the liquid in a continuous band on the surface of the hot strip material, utilizing the heat of the strip material to dry the deposited liquid, and applying additional heat to the dried deposit to fuse it to the strip material.

2. The method of striping a flexible strip of a vinyl chloride resin material, which comprises extruding a continuous strip of the material through a heated die, advancing the strip material retaining heat from the extrusion operation adjacent to a nozzle, flowing a viscous striping liquid containing a vinyl chloride resin in a volatile suspension medium but of a color contrasting with that of the strip from the nozzle and depositing the liquid in a continuous band on the surface of the hot strip material, utilizing the heat of the strip material to dry the deposited liquid, and applying additional heat to the dried deposit to fuse it to the strip material.

3. The method of claim 2 in which the suspension medium is a volatile organic solvent for the resin.

4. The method of claim 2 in which the flexible strip is a coating extruded around a wire, and the suspension medium is a volatile organic solvent for the resin.

5. The method of striping a flexible strip of a vinyl chloride resin material, which comprises extruding a continuous strip of the material through a heated die, advancing the strip material retaining heat from the extrusion operation adjacent to a nozzle, flowing from said nozzle a viscous striping liquid comprising a vinyl chloride resin, a plasticizer therefor, and a volatile suspension medium, said liquid being of a color contrasting with that of said strip, and depositing the liquid in a continuous band on the surface of the hot strip material, utilizing the heat of the strip material to solidify the deposited liquid, and applying additional heat to the solidified deposit to fuse it to the strip material.

EUGENE L. SLINGLUFF.
DONALD R. SCHEU.